United States Patent [19]

Chu et al.

[11] Patent Number: 4,778,666

[45] Date of Patent: Oct. 18, 1988

[54] CRYSTALLIZATION METHOD EMPLOYING MICROWAVE RADIATION

[75] Inventors: Pochen Chu, West Deptford, N.J.; Francis G. Dwyer; James C. Vartuli, both of West Chester, Pa.

[73] Assignee: Mobil Oil Corporation, New York, N.Y.

[21] Appl. No.: 937,809

[22] Filed: Dec. 4, 1986

[51] Int. Cl.$^4$ .................... C01B 33/20; C01B 33/26; C01B 33/28

[52] U.S. Cl. .................... 423/326; 423/328; 423/329; 423/598; 423/594; 423/608; 423/618; 423/624; 204/157.43; 204/157.45; 204/157.5; 204/157.51; 502/61; 502/63; 502/64; 502/65; 502/66; 502/71; 502/77; 502/78; 502/79

[58] Field of Search .......... 204/157.15, 157.4, 157.43, 204/157.44, 157.45, 157.47, 157.5, 157.51; 23/295 R, 300, 301, 302 R, 302 T, 305 A, 305 F, 305 RE; 423/328–329, 332, 334, 326, 598, 594, 608, 618, 624; 502/60–61, 63–64, 66–71, 73, 74, 76–79, 208, 214

[56] References Cited

U.S. PATENT DOCUMENTS

| | | | |
|---|---|---|---|
| 3,104,216 | 9/1963 | Ruskin | 204/157.43 |
| 4,042,362 | 8/1977 | MacDowell | 501/3 |
| 4,310,440 | 1/1982 | Wilson | 502/208 X |
| 4,440,871 | 4/1984 | Lok | 502/214 |
| 4,567,029 | 1/1986 | Wilson | 502/208 |
| 4,661,467 | 4/1987 | Kuehl | 502/60 |

FOREIGN PATENT DOCUMENTS 61-197493  9/1986  Japan .............. 204/157.43

OTHER PUBLICATIONS

Roussy et al., "Selective Energy Supply to Adsorbed Water and Nonclassical Thermal Process During Microwave Dehydration of Zeolite," *J. Phs. Chem.*, 85, 2199–2203.

Primary Examiner—John F. Niebling
Assistant Examiner—Ben C. Hsing
Attorney, Agent, or Firm—Alexander J. McKillop; Michael G. Gilman; Robert B. Furr, Jr.

[57] ABSTRACT

A crystallization process employing microwave energy is described. The process is especially useful in the manufacture of porous crystalline materials.

27 Claims, No Drawings

CRYSTALLIZATION METHOD EMPLOYING MICROWAVE RADIATION

BACKGROUND OF THE INVENTION

This invention relates to a method of crystallizing materials from aqueous crystallization media employing microwave radiation. In one embodiment, the crystallization method herein is utilized in the manufacture of porous crystalline materials which are especially useful for the catalysis of a wide variety of chemical conversion processes.

Zeolitic materials, both natural and synthetic, have been demonstrated in the past to have catalytic properties for various types of hydrocarbon conversion. Certain zeolitic materials are ordered, porous crystalline metallosilicates having a definite crystalline structure as determined by X-ray diffraction within which there are a number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of large dimensions, these materials have come to be known as "molecular sieves" and are utilized in a variety of ways to take advantage of these properties.

Such molecular sieves, both natural and synthetic, include a wide variety of positive ion-containing crystalline metallosilicates. For example, in the case of the aluminosilicates, these materials can be described as a rigid three-dimensional framework of $SiO_4$ and $AlO_4$ tetrahedra which are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate or other metallosilicate zeolite by suitable selection of the cation. The spaces between the tetrahedra are occupied by molecules of water prior to dehydration.

Prior art techniques have resulted in the formation of a great variety of synthetic porous, crystalline metallosilicate zeolites. The zeolites have come to be designated by letter or other convenient symbols, as illustrated by zeolite A (U.S. Pat. No. 2,882,243), zeolite L (U.S. Pat. No. 3,130,006), zeolite X (U.S. Pat. No. 2,882,244), zeolite Y (U.S. Pat. No. 3,130,007), zeolite ZK-5 (U.S. Pat. No. 3,247,195), zeolite beta, (U.S. Pat. No. 3,308,069), zeolite ZK-4 (U.S. Pat. No. 3,314,752), zeolite ZSM-4 (Great Britain Pat. No. 1,117,568), zeolite ZSM-5 (U.S. Pat. No. 3,702,886, now U.S. Pat. No. Re. 29,948), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-22, zeolite, ZSM-23 (U.S. Pat. No. 4,076,842), zeolite ZSM-34, zeolite ZSM-35 (U.S. Pat. No. 4,016,245), zeolite ZSM-39 (U.S. Pat. No. 4,259,306), zeolites ZSM-21 and ZSM-38 (U.S. Pat. No. 4,046,859), ZSM-48 (U.S. Pat. No. 4,375,573), ZSM-51 (U.S. Pat. No. 4,568,654), zeolite EU-1 (European Patent Application 0042 226), zeolite EU-2 (UK Patent Application No. GB 2077709 A), zeolite EU-4 (European Patent Application No. 0 063 436), and zeolites NU-6(1) and NU-6(2) (U.S. Pat. No. 4,397,825), merely to name a few. Zeolites containing a framework element other than, or in addition to, aluminum, e.g., boron, iron, titanium, zirconium, germanium, gallium, etc., are known from, inter alia, U.S. Pat. Nos. 3,328,119; 3,329,480; 3,329,481; 4,414,423 and 4,417,088.

A summary of the channel description and composition of these and other zeolite catalysts is set forth below.

| ZEOLITE CHANNEL AND COMPOSITION SUMMARY | | | |
|---|---|---|---|
| Zeolite | Isotypes[a] | Silica/Alumina Ratio[b] | Channel Description[c] |
| Medium Pore | | | |
| ZSM-35 | Ferrierite | >8 | 2d, 4.3 × 5.5–3.4 × 4.8 A |
| ZSM-22 | | >20 | 1d, 4.5 × 5.5 A |
| ZSM-23 | | 40–250 | 1d, 4.5 × 5.6 A |
| ZSM-48 | | >25 | 1d, 5.3 × 5.6 A |
| ZSM-5 | | >12 | 3d, 5.4 × 5.6–5.1 × 5.5 A |
| ZSM-11 | | 20–90 | 3d, 5.4 × 5.6 A |
| ZSM-50 | | 20–100 | 1d, 4.5 × 6.3 A |
| ZSM-12 | | 20–100 | 1d, 5.7 × 6.1 A |
| Heulandite | | 7 | 2d, 4.4 × 7.2–4.0 × 5.5 A |
| Offretite | | 7 | 3d, 6.4–3.6 × 5.2 A |
| Large Pore | | | |
| Mordenite | | 10 | 1d, 5.8 × 7.0 A |
| Beta | | 5–100 | 3d, 6.2 × 7.6–5.5 × 6.3 A |
| Gmelinite | | 4 | 3d, 7.0–3.6 × 3.9 A |
| Linde Type L | | 6 | 1d, 7.1 A |
| ZSM-4 | Omega Mazzite | 3–20 | 1d, 7.4 A |
| Faujasite | X,Y | 2–6 | 3d, 7.4 A |

[a]Common isotypes.
[b]Typical composition ranges.
[c]Dimensionality followed by simplified listing of limiting pore sizes.

Synthetic zeolites are generally prepared by providing an aqueous solution of the desired oxides and other required components of the crystallization reaction medium and thereafter crystallizing the zeolite under heat and pressure. For specific synthesis and post-crystallization processing conditions for a particular zeolite, reference may be made to the extensive literature on the subject and, in particular, the U.S. patents referred to above, the contents of which are incorporated by reference herein.

Other porous crystalline materials which are not zeolitic but which also exhibit catalytic adsorption and/or catalytic properties characteristic of the zeolites are known. U.S. Pat. Nos. 4,310,440 and 4,385,994 both describe porous crystalline aluminophosphates and U.S. Pat. No. 4,440,871 describes porous crystalline silicoaluminophosphates which are useful as adsorbents and as catalysts for a variety of hydrocarbon conversions. U.S. Pat. No. 4,567,029 describes porous crystalline metal aluminophosphates containing as lattice constituents in addition to $AlO_2$ and $PO_2$ structural units, one or a mixture of two or more of the metals Mg, Mn, Co and Zn in tetrahedral coordination with oxygen atoms. The contents of these patents are incorporated by reference herein.

The aluminophosphates are prepared by hydrothermal crystallization of a reaction mixture prepared by combining a reactive source of phosphate, alumina and water and at least one structure-directing or templating agent which can include an organic amine and a quarternary ammonium salt. The silicoaluminophosphates are synthesized by hydrothermal crystallization from a reaction mixture containing reactive sources of silica, alumina and phosphate, an organic templating, i.e., structure-directing agent, preferably a compound of an element of Group VA of the Periodic Table, and optionally an alkali metal. In the case of both types of material, the reaction mixture is placed in a reaction vessel inert toward the reaction system and heated until crystallized, usually a period of from about 2 hours to about 2 weeks. The solid crystalline reaction product is then recovered by any convenient method such as filtration or centrifugation.

While it is known from Roussy et al., "Selective Energy Supply To Adsorbed Water and Nonclassical Thermal Process during Microwave Dehydration of Zeolite," *J. Phys. Chem.* 85. 2199–2203 (1981) that microwave energy can be used to desorb water from a zeolite, the use of microwave energy in the crystallization of synthetic zeolites is believed to be novel.

SUMMARY OF THE INVENTION

It is an object of this invention to provide a method for the crystallization of a crystallizable product employing microwave energy.

It is a further object herein to provide a method of crystallizing a porous crystalline composition from a crystallization reaction medium utilizing microwave energy.

It is still another object of the present invention to provide a porous, crystalline metallosilicate zeolite of relatively small crystal size.

These and other objects of the present invention are obtained by the crystallization method herein which comprises:

(a) providing a crystallization medium comprising a crystallizable material and a heat transfer agent sympathetic to microwave energy; and, (b) subjecting the crystallization medium to microwave energy to crystallize the crystallizable material.

The term "crystallizable material" as used herein shall be understood to include a crystallizable material which is initially present in the crystallization medium as well as the precursors, or formative components, of the crystallizable material. In the case of the latter, subjecting the crystallization medium to microwave energy in accordance with this invention supplies the thermal energy required to drive the reaction and effect crystallization.

A general advantage of the foregoing crystallization method lies in its ability to provide relatively small crystals at higher rates of productivity compared to known hydrothermal crystallization procedures. Such crystals typically exhibit greater catalytic activity since their relatively small size permits faster diffusion of reactant(s) into, and product(s) out of, the catalyst. While the rate of nucleation is not greatly influenced by temperature, crystal growth is fairly temperature-sensitive so that when conventional hydrothermal processes are utilized in obtaining relatively small crystals, it is necessary to reduce the temperature and concomitantly, increase the time, required to effect crystallization. Longer crystallization periods not only reduce productivity, they increase the risk that the desired crystalline material will become contaminated with undesirable crystalline material. The unexpectedly rapid crystallization rates which are made possible by the method of the present invention permit one to obtain smaller crystals within a shorter period than is possible with conventional hydrothermal crystallization techniques and with less risk of contamination than with the latter procedures.

In the case of synthetic zeolites, the foregoing method has surprisingly been found to provide the desired zeolites but with altered morphologies compared to those of the same zeolites prepared by known hydrothermal crystallization methods.

DESCRIPTION OF THE PREFERRED EMBODIMENTS

The method of the present invention is useful for the crystallization of all manner of materials from crystallization media generally, and for the preparation of porous crystalline materials such as the porous crystalline metallophosphate materials and the porous crystalline metallosilicate zeolites in particular.

Essentially any medium from which a crystalline material can be formed is suitable for practicing the invention. In the case of inorganic crystalline materials, the heat transfer agent sympathetic to microwave energy which is an essential constituent of the crystallization medium herein can be water or an organic compound, e.g., a liquid hydrocarbon, an alkylene glycol such as ethylene glycol, etc. Materials which absorb microwave energy do so by vibrating at the same frequency as the microwave. For the purposes of this disclosure, a heat transfer agent is considered to be sympathetic to microwave energy if it absorbs microwave energy. In contrast, if the heat transfer agent reflects or is transparent to microwave energy, it is not considered to be sympathetic to microwave energy. One type of non-aqueous crystallization medium which is suitable herein is that disclosed in U.S. Pat. No. 3,503,900, the contents of which are incorporated by reference herein. According to this patent, a zeolitic molecular sieve is crystallized from a crystallization medium containing a hydrocarbon oil as the heat-transfer medium. Suitability of a particular material for use as a heat transfer agent in the method of this invention can be readily determined by simple and routine testing.

For illustration purposes, the crystallization method herein will be more fully described in connection with the preparation of two zeolites, i.e., the sodium form of zeolite A (NaA), a small pore zeolite useful as an adsorbent, detergent builder, etc., and zeolite ZSM-5, a medium pore zeolite having application as a catalyst for a wide variety of chemical conversion processes including hydrocracking, hydrofinishing, hydrodewaxing, oligomerization, isomerization, disproportionation, alkylation, reforming, etc.

In making zeolite NaA, representative reactants are silica gel, silicic acid or sodium silicate as a source of silica. Alumina may be obtained from activated alumina, gamma alumina, alpha alumina, alumina trihydrate, or sodium aluminate. Sodium hydroxide may supply the sodium ion and in addition assist in controlling the pH. Preferably the reactants are water soluble. A solution of the reactants in the proper proportions is placed in a container, suitably of glass or other material which does not significantly interfere with the passage of microwave radiation. The container is preferably closed to prevent loss of water and the reactants are subjected to microwave heating for the required time. A convenient and preferred procedure for preparing the reactant mixture is to make an aqueous solution containing the sodium aluminate and hydroxide and add this, preferably with agitation, to an aqueous solution of sodium silicate. The system is stirred until homogeneous or until any gel which forms is broken into a nearly homogeneous mix. After this mixing, agitation may be stopped as it is unnecessary to agitate the reacting mass during the formation and crystallization of the zeolite, however, mixing during formation and crystallization has not been found to be detrimental. The initial mixing of ingredients is conveniently done at room temperature but this is not essential.

A crystallization temperature of about 100° C. is particularly advantageous in this process. However, satisfactory results can be obtained with the temperature of the reaction as high as about 150° C., the pressure being atmospheric or at least that corresponding to the vapor pressure of water in equilibrium with the mixture at the higher temperature. After the reaction period, the NaA crystals are recovered, e.g., by filtration, washed and dried.

Zeolite ZSM-5 can be suitably prepared by preparing solution containing a tetraalkylammonium compound, e.g. tetrapropylammonium bromide, a Group IA or IIA oxide, e.g., sodium oxide, an oxide of a Group IIIB, an oxide of Group IVB, and a heat transfer agent which is sympathetic to microwave radiation such as water and/or an organic compound such as ethylene glycol and having a composition, in terms of mole ratios of oxides, falling within the following ranges:

|  | Broad | Preferred | Particularly Preferred |
|---|---|---|---|
| $OH^-/YO_2$ | 0.07–10.0 | 0.1–0.8 | 0.2–0.75 |
| $R_4N^+/(R_4N^+ + Na^+)$ | 0.2–0.95 | 0.3–0.9 | 0.4–0.9 |
| $H_2O/OH^-$ | 10–300 | 10–300 | 10–300 |
| $YO_2/W_2O_3$ | 20–infinity | 20–3000 | 40–200 | wherein R is the tetraalkyl group, W is the Group IIIB compound, and Y is the Group IVB compound and maintaining the mixture until crystals of the zeolite are formed. Thereafter, the crystals are separated from the liquid and recovered. Typical reaction conditions consist of heating the foregoing reaction mixture to a temperature of from about 75° C. to 175° C. for a period of time of from about one hour to 60 days. A more preferred temperature range is from about 100° to 175° C. with the amount of time at a temperature in such a range being from about six hours to 8 days.

The digestion of the gel particles is carried out until crystals form. The solid product is separated from the reaction medium, as by cooling the whole to room temperature, filtering, and water washing.

The foregoing product is dried, e.g., at 230° F., for from about 8 to 24 hours. Of course, milder conditions may be employed if desired, e.g., room temperature under vacuum.

ZSM-5 is preferably formed as an aluminosilicate. The composition can be prepared utilizing materials which supply the appropriate oxide. Such compositions include for an aluminosilicate, sodium aluminate, alumina, aluminum sulfate, sodium silicate, silica hydrosol, silica gel, silicic acid, sodium hydroxide or other Group IA or IIA hydroxides, and tetraalkylammonium compounds, e.g. tetrapropylammonium bromide. In addition to tetrapropylammonium compounds, tetramethyl, tetraethyl or tetrabutyl ammonium compounds can similarly be employed. Glycols such as ethylene glycol are also useful for this purpose. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate:- tetrapropylammonium cation can be supplied by the hydroxide. The reaction mixture can be prepared either batchwise or continuously. Crystal size and crystallization time of the crystalline metal organosilicate composition will vary with the nature of the reaction mixture employed, the intensity of the microwave energy, its duration and other factors as will be apparent to those skilled in this art.

The as synthesized ZSM-5 can have the original components thereof replaced by a wide variety of others according to techniques well known in the art. Typical replacing components would include hydrogen, ammonium, alkyl ammonium and aryl ammonium and metals, other than metals of Group IIIA, including mixtures of the same. The hydrogen form may be prepared, for example, by substitution of original sodium with ammonium. The composition is then calcined at temperature of, say, 1000° F. causing evolution of ammonia and retention of hydrogen in the composition. Of the replacing metals, preference is accorded to metals of Groups II, IV and VIII of the Periodic Table.

ZSM-5 crystals are then preferably washed with water and dried at a temperature ranging from 150° F. to about 600° F. and thereafter calcined in air or other inert gas at temperatures ranging from 500° F. to 1500° F. for periods of time ranging from 1 to 48 hours or more. The ZSM-5 crystals can be composited with other materials, e.g., alumina, silica, silica-alumina, silica-zirconia, etc. as is known.

Microwave heating is employed in the crystallization method of this invention not only to direct the crystallization mechanism but also to increase the rate of crystallization. The useful frequency range of microwave energy herein contemplates electromagnetic radiation at about 600 to about 50,000 MHZ; preferably about 900 to about 30,000; more preferably about 900 to about 3600 MHZ; most preferably about 915 to about 2450 MHZ. In order to be suitably exposed to the microwave energy, the crystallization medium must be contained within a vessel fabricated from a material which absorbs little or none of the microwave energy, e.g., the polytetrafluoroethylenes, quartz, ceramic, polypropylene, polyethylene, some polyesters, alumina, beryllia, some silicones, some phenolics, and polyphenylene oxide. Other materials moderately low in absorption of microwave energy and which are therefore useful herein are: cured epoxies, alkyds, polyester, urethanes, glass, polyamides, polyimides, some phenolics, some melamines, and polycarbonates.

Both meandering wave guides and resonating cavities can be used as means for exposing the crystallization medium to be heated to microwave radiation. The meandering wave guide system has the disadvantage of requiring a relatively shallow bed depth. This limitation is caused by the nature of the propagation of the electromagnetic radiation and the necessity for confining it within a hollow wave guide. In order to best utilize the electromagnetic radiation for heating, it is necessary to pass the crystallization medium to be heated through the center of the meandering wave guide since at the top and bottom of the wave guide the electric field is at its maximum while at its sides it as at its minimum. A shallow bed depth requires a relatively narrow opening in the wave guide; hence, there is no danger of radiation leakage out of the wave guide. As the bed depth increases, the height of the opening increases up into the zone of high field intensity allowing radiation leakage and resulting in lower overall heating efficiency. Accordingly, the preferred crystallization method utilizes a resonating cavity device since the bed depth is not so limited.

While the duration of exposure to the selected level of microwave energy can vary widely, and in any event will depend upon the composition of the crystallization medium, the configuration of the equipment and other apparent factors, periods of from about 30 minutes to about 24 hours or more are entirely suitable in most cases.

The following examples are further illustrative of the hydrothermal crystallization method of this invention.

The microwave radiation source used in the examples is an industrial size microwave system (CEM Corporation Model MDS-81) having a selectable power output of 0–600 watts and microwave radiation of 2450 MHZ.

EXAMPLE 1

This example illustrates the preparation of zeolite NaA by the microwave heating method herein and compares the resulting crystals with NaA crystals obtained by a conventional hydrothermal crystallization process.

100 Grams of $NaAlO_2$ and 34 grams of NaOH were dissolved in 520 g of water. Fifty-six grams of Hi-Sil, a precipitated silica, was added to the solution. The mixture was aged at ambient temperature for 2 hours then crystallized under microwave radiation in a closed glass jar with a capillary vent. At 50% power, zeolite NaA started to crystallize in as little as 5 minutes. It completely crystallizes in about 12 minutes at a temperature of 100° C. (as shown in Table II following Example 2).

A similar crystallization medium took 2 hours to crystallize under conventional hydrothermal crystallization conditions in a steam box. The product from the microwave crystallization was 85% crystalline, had a $SiO_2/Al_2O_3$ of 2.28 and Na/Al of 1.03. Scanning electron micrographs showed zeolite NaA resulting from the microwave crystallization to have more rounded edges than zeolite NaA prepared in the conventional manner, a property preferred in detergent builder applications.

EXAMPLE 2

This example illustrates the preparation of zeolite ZSM-5 by the process of the invention comparing the zeolite with ZSM-5 obtained by conventional hydrothermal crystallization procedures.

A crystallization reaction mixture was prepared by dissolving 12 g of NaOH, 30 g of tetrapropylammonium bromide in 250 g of water, then adding 575 g of Cab-O-Grip-II colloidal silica and 20 g of ZSM-5 seeds. A 200 g portion of the mixture was crystallized under microwave radiation in a glass jar with a capillary vent. At 300W, 2450 MHZ power, the sample almost completely crystallized within 100 minutes. A similar preparation took six hours to crystallize using conventional crystallization procedures (as shown in Table II below).

TABLE II

| | Properties of Zeolites Prepared By Microwave Radiation | | | | | | |
|---|---|---|---|---|---|---|---|
| | NaA | | | | ZSM-5 | | |
| Microwave Run Condition | | | | | | | |
| Power, % | 50 | 50 | 50 | — | 50 | 75 | — |
| Time, Min. | 11 | 20 | 30 | — | 120 | 100 | — |
| Hydrothermal Run | | | | 2 Hr., 100° C. | | | 6 Hr., 100° C. |
| Crystallinity, % | 85 | 90 | 95 | 95 | 75 | 85 | 90 |
| Chemical Composition | | | | | | | |
| $SiO_2$, % Wt | 32.76 | 32.21 | 33.32 | 34.27 | 83.16 | 84.58 | 81.09 |
| $Al_2O_3$, % Wt | 24.83 | 23.07 | 24.43 | 26.18 | 0.49 | 0.53 | 0.45 |
| Na, % Wt | 10.17 | 8.53 | 9.38 | 10.11 | 1.16 | 0.89 | 0.83 |
| N, % Wt | — | — | — | — | 0.54 | 0.48 | 1.2 |
| C, % Wt | — | — | — | — | 5.15 | 3.80 | 9.94 |
| Ash, % Wt | 80.58 | 80.08 | 84.28 | 83.38 | 85.06 | 87.46 | 83.86 |
| $SiO_2/Al_2O_3$, Mole | 2.24 | 2.37 | 2.32 | 2.20 | 288.5 | 271.3 | 306.3 |
| (Na + N)/Al | 0.91 | 0.77 | 0.85 | 0.86 | 9.5 | 7.0 | 13.8 |
| C/N | — | — | — | — | 11.1 | 9.2 | 9.7 |
| Adsorption | | | | | | | |
| $H_2O$, % | | | | | 7.5 | 7.3 | 6.6 |
| $CyC_6$, % | | | | | 2.0 | 3.8 | 8.6 |
| $nC_6$, % | | | | | 6.9 | 8.5 | 10.5 |

EXAMPLE 3

A mixture of 76 parts (by weight) water, 1 part sodium chloride, 23 parts HiSil and 3 parts ZSM-5 seeds was combined with a mixture of 20 parts water, 2 parts aluminum sulfate, 6 parts 50% sodium hydroxide solution, and 11 parts tetrapropylammonium bromide. This combined mixture was then split into two equal parts. One part was loaded into a teflon bottle and placed into a hot water bath (90° C.) for six days. The other half of the synthesis mixture was loaded into an identical teflon bottle and placed in the microwave unit. The microwave unit was programmed to maintain a solution temperature of approximately 90° C. for six days. After the six days both samples were washed, filtered, and dried. X-ray analyses indicated that ZSM-5 was synthesized in both examples and the chemical analyses and scanning electron micrographs indicated that both preparations were the same. Table III reports the results.

TABLE III

| | Crystallization of Zeolite ZSM-5 | |
|---|---|---|
| | Microwave Crystallization | Hydrothermal Crystallization |
| Silica/Alumina Ratio | 68 | 62 |
| Na, wt. % | 3.1 | 2.1 |
| N, wt. % | .63 | .51 |
| C, wt. % | 7.9 | 5.9 |

TABLE III-continued

| Crystallization of Zeolite ZSM-5 | | |
| --- | --- | --- |
| | Microwave Crystallization | Hydrothermal Crystallization |
| Adsorption, wt. % | | |
| Cyclohexane | 3.9 | 4.8 |
| n-Hexane | 9.0 | 9.8 |

EXAMPLE 4

A mixture of 1 part (by weight) aluminum sulfate, 3 parts sulfuric acid, and 27 parts water was combined with a mixture of 28 parts sodium silicate solution (28.5% $SiO_2$), 7 parts water, 2 parts ZSM-5 seeds, and 50 parts ethylene glycol. The combined mixture was loaded into a teflon bottle and placed into a microwave oven. The microwave unit was programmed to maintain a solution temperature of approximately 95° C. for 72 hours. After 72 hours, the sample was washed, filtered, and dried. X-ray analysis indicated that ZSM-5 was synthesized.

EXAMPLE 5

ZSM-5 crystallization was attempted using the same formula as described in Example 4 except that all of the water was replaced by equal amounts of ethylene glycol. The only remaining source of water in the mixture was present in the sodium silicate solution. The synthesis mixture was processed as described in Example 4. After 72 hours the sample was washed, filtered, and dried. The X-ray analysis indicated that ZSM-5 was synthesized.

EXAMPLE 6

A mixture of 1 part (by weight) aluminum sulfate and 27 parts water was combined with a mixture of 14 parts HiSil (an amorphous silica), 3 parts 50% sodium hydroxide solution, 27 parts water, 4 parts ZSM-5 seeds, and 76 parts ethylene glycol. This combined mixture was loaded into a teflon bottle and processed as described in Example 4. After 72 hours the X-ray analysis indicated that ZSM-5 was synthesized.

What is claimed is:

1. A crystallization method which comprises:
    (a) providing a crystallization medium comprising crystallizable zeolite precursor materials and a heat transfer agent sympathetic to microwave energy; and
    (b) subjecting the crystallization medium to microwave energy at a frequency range effective to crystallize the crystallizable zeolite precursor materials to produce zeolite.
2. The crystallization method of claim 1 wherein the heat transfer agent is water.
3. The crystallization method of claim 2 wherein the water and the crystallizable zeolite precursor materials are contained within a vessel fabricated from a material which absorbs little or none of the microwave energy.
4. The crystallization method of claim 3 wherein the vessel is fabricated from glass, ceramic or a polytetrafluoroethylene.
5. The crystallized material resulting from the crystallization method of claim 2.
6. The crystallization method of claim 1 wherein the heat transfer agent is an organic material.
7. The crystallized material resulting from the crystallization method of claim 6.
8. The crystallization method of claim 1 wherein the zeolite precursors are those of a porous crystalline material.
9. The crystallized material resulting from the crystallization method of claim 8.
10. The crystallization method of claim 1 wherein the zeolite precursors are those of a porous crystalline metallosilicate zeolite material.
11. The crystallization method of claim 10 wherein the heat transfer agent is water.
12. The crystallization method of claim 10 wherein the heat transfer agent is an organic material.
13. The crystallized material resulting from the crystallization method of claim 10.
14. The crystallization method of claim 10 wherein the metallosilicate zeolite material is selected from the group consisting of zeolites A, L, X, Y, ZK-4, ZK-5, ZSM-4, ZSM-5, ZSM-11, ZSM-12, ZSM-20, ZSM-22, ZSM-23, ZSM-34, ZSM-35, ZSM-38, ZSM-48 and ZSM-51.
15. The crystallization method of claim 14 wherein the zeolite comprises a crystalline framework structure containing aluminum.
16. The crystallized material resulting from the crystallization method of claim 15.
17. The crystallization method of claim 14 wherein the zeolite comprises a crystalline framework structure containing a metal in addition to or other than aluminum.
18. The crystallization method of claim 17 wherein said metal other than, or in addition to, aluminum is selected from the group consisting of boron, iron, titanium, zirconium, germanium and gallium.
19. The crystallized material resulting from the crystallization method of claim 18.
20. The crystallized material resulting from the crystallization method of claim 17.
21. The crystallized material resulting from the crystallization method of claim 14.
22. The crystallization method of claim 1 wherein the frequency range of microwave energy is from about 600 to 50,000 MHZ.
23. The crystallization method of claim 1 wherein the frequency range of microwave energy is from about 900 to about 30,000 MHZ
24. The crystallization method of claim 1 wherein the frequency range of microwave energy is from about 900 to about 3600 MHZ.
25. The crystallization method of claim 1 wherein the frequency range of microwave energy is from about 915 to about 2450 MHZ.
26. The crystallization method of claim 1 employing a resonating cavity microwave device.
27. The crystallized material resulting from the crystallization method of claim 1.

* * * * *

UNITED STATES PATENT AND TRADEMARK OFFICE
CERTIFICATE OF CORRECTION

PATENT NO. : 4,778,666
DATED : October 18, 1987
INVENTOR(S) : P. Chu et al

It is certified that error appears in the above-identified patent and that said Letters Patent is hereby corrected as shown below:

Col. 8, line 10, delete "250"
Col. 8, line 11, after "in" and before "g" insert --250--

Signed and Sealed this

Eleventh Day of April, 1989

Attest:

DONALD J. QUIGG

Attesting Officer

Commissioner of Patents and Trademarks